Patented Nov. 3, 1925.

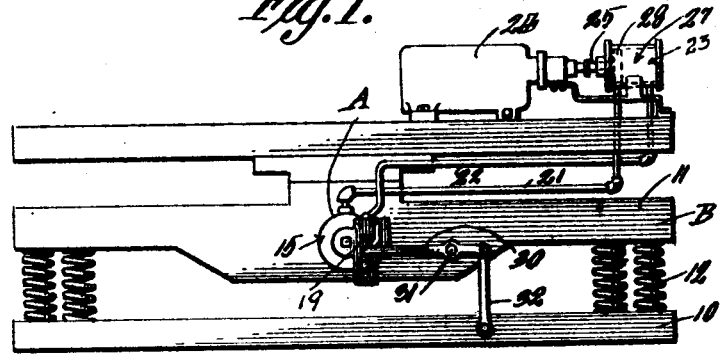

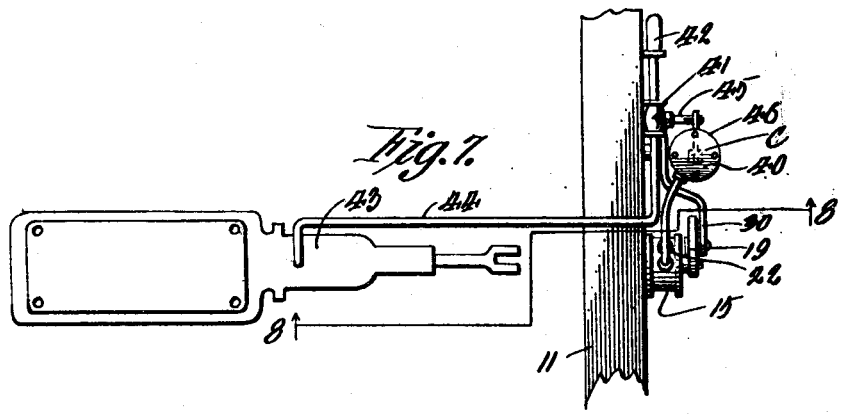
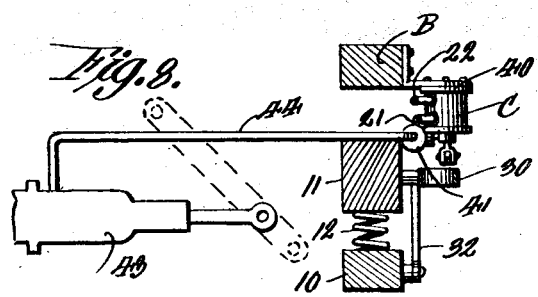
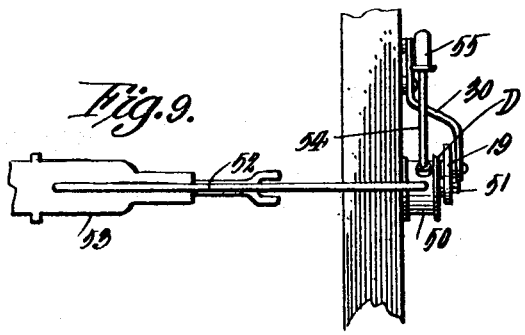

1,560,371

UNITED STATES PATENT OFFICE.

JOHN R. BENTON, OF AJO, ARIZONA, ASSIGNOR OF ONE-THIRD TO EVERETT W. MARSH, OF AJO, ARIZONA.

AUTOMATIC BRAKE CONTROL.

Application filed January 12, 1925. Serial No. 2,014.

*To all whom it may concern:*

Be it known that I, JOHN R. BENTON, a citizen of the United States, residing at Ajo, in the county of Pima and State of Arizona, have invented certain new and useful Improvements in Automatic Brake Controls, of which the following is a specification.

This invention appertains to air brake systems for railroad rolling stock and the like and the primary object of the invention is to provide a novel air brake equipment for freight cars in which the brake pressure can be varied in a novel manner according to the load, thereby effectively preventing the locking of the train wheels and the troubles incident thereto, such as skidding, flat wheels, and the like.

In a large percentage of railroad freight cars, flat wheels are caused by skidding, due to the fact that in order to hold a train descending grades, the cars are equipped with a brake pressure sufficient to hold the cars when loaded and as this same brake pressure remains when the cars are empty, the wheels will lock and skid.

It is therefore another prime object of the invention to provide novel means for controlling the brake pressure according to the load, the brake pressure being controlled in a novel manner according to the position of the car bolsters relative to the sand or truck bolsters.

A further object of the invention is to provide novel means for preventing the operation of the mechanism incident to the usual vibration or up and down movement of the body of the car, thereby insuring of the proper operation of the brake mechanism under all conditions.

A further object of the invention is the provision of a valve for controlling the flow of air to the ordinary part of an air brake system and novel means for operating the valve by movement of the car bolster relative to the sand bolster when the car is under load and when the same is empty.

A still further object of the invention is to provide a novel automatic brake control mechanism of the above character, which will be durable and efficient in use, one which will be simple and easy to manufacture and one which can be placed upon the market and incorporated with an ordinary type of freight car and brake therefor at a small cost.

With these and other objects in view, the invention consists in the novel construction, arrangement and formation of parts, as will be hereinafter more fully described and claimed, and illustrated in the accompanying drawings, in which drawings:

Figure 1 is a rear elevation of one form of the improved automatic brake control showing the same incorporated with a freight car, only a sufficient portion of the car and its conventional air brake being shown to illustrate the operation of the improved mechanism;

Figure 2 is a detail perspective view showing the two way cock or air valve and a part of the actuating mechanism therefor;

Figure 3 is a detail elevation of the novel head or operating crank carried by the two way valve, and showing the actuating roller disposed in the slot thereof, the roller being shown in cross section;

Figure 4 is a detail horizontal section taken on the line 4—4 of Figure 3, looking in the direction of the arrows;

Figure 5 is a detail vertical section taken on the line 5—5 of Figure 3 looking in the direction of the arrows illustrating the novel operating head or crank.

Figure 6 is a side elevation of a slightly modified form of the novel automatic air brake control showing the same incorporated with a portion of a brake car, Figure 7 is a plan view of the same, Figure 8 is a detail transverse section taken on the line 8—8 of Figure 7 looking in the direction of the arrows, Figure 9 is a plan view of a still further modified form of the improved automatic air brake control.

Referring to the drawing in detail, wherein similar reference characters designate corresponding parts throughout the several views, the letter A generally indicates one form of the invention and B a fragment of a freight car with which the same can be associated.

Only a sufficient part of the freight car B has been shown to illustrate the operation of the device and as shown the same includes the sand bolster 10 and the car bolster 11, which is supported by the sand bolster 10 by the use of suitable springs 12. It can be seen by this construction that the position of the car bolster 11 relative to the sand bolster 10 will vary according to the load placed upon the car bolster.

The form of my invention indicated by the reference character A as shown in Figure 1 of the drawings is adapted to be used particularly in connection with air brake systems embodying the extra load brakes and embodies a two-way valve or cock 15, which is rigidly attached in any desired way to the car bolster 11. This two way valve 15 can be of any standard construction and therefore has not been shown in detail. This two way valve 15 however embodies a casing 16 and the rotatable axial shaft 17 which carries the valve plug or disk. The outer end of shaft 17 is provided with a reduced polygonal extension 18 for receiving the novel operating head or crank 19 which will be hereinafter more fully described, and which forms an important part of the invention in all of the forms thereof. The casing 16 is provided with an exhaust port 20 and outlet ports which have communicating therewith the pipes 21 and 22, which lead to the piston valve 23, which operates the conventional change over valve of the brake cylinder 24. The piston rod 25 of the piston valve 23 is connected with the stem of the change over valve as clearly shown in the drawing. Air is permitted to flow from the train pipe, by means of a branch air pipe 26 into the valve casing 16 and the valve is adapted to control the flow of the air through the pipes 21 and 22 to the piston valve 23.

The piston valve 23 embodies a cylinder 27 and a piston 28 reciprocally mounted therein and it is to be noted that the pipe 21 leads to the inner end of the cylinder, while the pipe 22 leads to the outer end of the cylinder.

In order to bring about the proper operation of the two way valve or cock 15 an operating lever 30 is provided, which is rockably mounted at a point intermediate its end on a pivot pin 31 carried by the car bolster 11. The outer end of the lever is connected by means of a link 32 with the sand bolster 10 and it is obvious that upon movement of the car bolster 11 relative to the sand bolster that the lever 30 will be actuated. The inner end of the lever is provided with an inwardly extending pin 33 on which is rotatably mounted a roller 34, which is operatively connected with the novel operating head or crank 19 carried by the operating shaft 17 of the valve plug.

The operating head or crank 19 embodies a flat plate 35, which is rigidly connected to the polygonal end 18 of the valve shaft 17 and it is to be noted that the head extends radially from the shaft. This plate 35 is provided with an inclined slot 36 which terminates in straight guide portions, 37 and 38. The slot 36 is adapted to receive the roller 34 as clearly shown in Figures 3 to 5 inclusive of the drawing. In operation of this form of the invention, when the car is under-load the bolster 11 will be positioned relatively close to the bolster 10 which will cause the downward swinging of the inner end of the lever 30. The roller 34 operating in the inclined slot 36 will turn the crank or head 19 a sufficient distance to move the valve plug of the two way valve or cock so as to allow the air to flow through the pipe 21 causing the operation of the piston 28 and the actuation of the change over valve mechanism. This will increase the brake pressure and permit the brakes to be applied with full force on the wheels.

When the car is unloaded the bolster 11 will rise causing the upward swinging of the inner end of the lever 30 which will cause movement of the crank or head 19 in a counter-clockwise direction. This will cause the flow of the air to the pipe 22 to the opposite end of the cylinder which will move the piston to the right causing the operation of the change over valve and relieving the brake pressure.

Attention is directed to the position of the roller 34 of the operating lever 30 when the crank or head 19 is in either one of its positions, for permitting the flow of air through the pipe 21 or 22 and it can be seen that the roller will be at either end of the inclined slot 36 in alinement with the straight portions 37 and 38 of the slot. In view of the position of the head or crank the straight portions 37 and 38 of the slot 36 will permit swinging movement of the roller incident to the vibration or the up and down movement of the body of the car. This will effectively prevent the operation of the two way valve or cock during the ordinary travel of the train.

When the piston 28 is being moved in the cylinder 27 from one end thereof to the other air is permitted to escape from the cylinder through one of the pipes, through the exhaust port 20 in the valve casing to the atmosphere.

In Figures 6 to 8 inclusive I have shown another form of the invention generally indicated by the reference character C and this form of the invention is adapted to be used with the ordinary type of air brake system. The form C of the invention also embodies the use of the two way cock 15 which is of the same construction shown in the previous form just described and this valve is operated in the same way. In this form of the invention the air pipes 21 and 22 lead to a piston valve 40 which is adapted to control the operation of a one way valve 41 utilized for permitting the air to escape through a conventional pop valve 42 from the brake cylinder 43 of the air brake system. By referring to Figure 7 of the drawing it can be seen that the brake cylinder 43 is provided with a lead-off pipe 44 which terminates in the pop valve 42. The one way valve 41, as clearly shown in the drawings is incorporated in the length of the pipe 44. In order to permit the operation of the valve plug of the one way valve 41 the operating shaft 45 thereof is provided with a manipulating crank 46, which is in turn pivotally connected as at 47 to the outer end of the piston rod 48 of the piston valve 40. In operation of the improved device, when the car is loaded, the two way cock will be operated so as to direct the air through pipe 22 into the upper end of the piston valve 40 causing the downward movement of the piston rod 47 moving the cut out or one way cock to its closed position. This will hold the air pressure against the plunger of the brake cylinder, thereby assuring full standard brake pressure for the car.

When the car is unloaded and the bolster 11 is raised by the car springs the two way cock or valve 16 will be operated so as to direct the air through the pipe 21 and raise the piston causing the opening of the one way or cut out cock. This will permit the escape of air through the pop valve 42 retaining only the desired amount of air pressure in the brake cylinder. The release or pop valve 42 can be set, so as to permit the air to escape to a predetermined pressure, as is well understood. The roller 34 acts in slots 37 and 38 in the same manner as heretofore described, so as to take care of the jigging or up and down movement of the body of the car incident to the ordinary travel of the train.

In the modified form of the invention shown in Figure 9 of the drawings, which is generally indicated by the reference charter D the piston valve is eliminated, as well as the two way cock and a cut out or one way cock 50 is used in lieu thereof. The operating stem or shaft 51 of the one way or cut out cock 50 is provided with the novel crank or head 19, which is actuated by the operating lever 30, in the same manner as described in forms A and C. The cut out or one way cock 50 has connected to one port thereof the air pipe 52 leading from the brake cylinder 53 of the conventional air brake system, while the other port of the cut out valve has connected thereto an outlet pipe 54, which is provided with a release valve or pop valve 55. This release or pop valve 55 is set to the desired pressure.

When the car is under load the one way or cut out valve 50 will be actuated so as to prevent the passage of air through the pipe 52 to the pipe 54 and thus the full air pressure will be retained in the brake cylinder. When the car is unloaded, the cut out or one way valve 50 will be actuated so as to establish communication between the pipe 52, and the pipe 54 permitting the air to flow through the release or pop valve 55 until the desired pressure is obtained.

Referring again to the form of my invention shown in Figure 1 of the drawings it is to be noted that the improved device does not interfere with the air until the same has passed the triple valve, thus the device will not interfere with the operation of the brakes of any other car in the train.

Changes in details may be made without departing from the spirit and scope of this invention but what I claim as new is:

1. The combination with a railroad car embodying a sand bolster and a car bolster resiliently supported by the sand bolster, of a device for automatically governing the brake pressure in an air brake system according to the load including an operating lever rockably mounted at a point intermediate its ends upon the car bolster, a link operatively connecting one end of the lever to the sand bolster, a control valve carried by the car bolster embodying a stem, a crank carried by the stem, and means for operatively connecting the inner end of the lever to the crank.

2. In a device for automatically governing the brake pressure in an air brake system for a railroad car according to the load carried thereby, a control vlave, carried by the car bolster, a radially extending head carried by the valve, an operating lever rockably mounted at a point intermediate its ends to the car bolster, a link operatively connecting one end of the lever to the sand bolster of the car and means operatively connecting the other end of the lever to the head for operating the control valve according to the position of the car bolster relative to the sand bolster.

3. In a device for automatically governing the brake pressure in an air brake system for a railroad car according to the load carried thereby, a control valve connected with the bolster of the car, an operating lever rockably mounted at a point intermediate its ends to the car bolster, means operatively connecting one end of the lever to the sand bolster of the car, a radially extending operating head carried by the control valve having an inclined slot formed therein and oppositely extending straight slots communicating with the terminals of the inclined slots, a roller carried by the other end of the lever normally positioned in said inclined slot, as and for the purpose specified.

4. In a device for automatically governing the brake pressure in an air brake system for a railroad car according to the load carried thereby, a control valve embodying a rotary stem, a rearwardly extending operating head carried by the stem for movement therewith having an inclined slot formed therein, an operating lever rockably mounted at a point intermediate its ends on the car bolster, a link operatively connecting the outer end of the lever to the sand bolster of the car, and a laterally extending roller carried by the inner end of the lever mounted in said slot, the head being provided with oppositely extending radially disposed slots communicating with the terminals of the inclined slot for receiving the roller when the same is disposed at either end of the inclined slot, whereby movement of the head will be prevented by vibration of the car bolster.

5. In a brake mechanism, a brake cylinder, a change over valve for the brake cylinder including a stem, a piston valve embodying a cylinder, a piston reciprocally mounted on the cylinder, a piston rod carried by the piston and connected with the stem, a two way valve, a branch air pipe connected with the two way valve, outlet pipes connected with the two way valve communicating with the opposite end of the piston valve, the two way valve including a stem, and means controlled by the weight of the load automatically actuating the stem of the two way valve.

6. In a brake mechanism, a brake cylinder, a pipe extending from the cylinder, a pop valve in said pipe, a cut out valve in the pipe between the pop valve and the brake cylinder, and means controlled by the weight of the load in a car for automatically controlling the opening and closing of the cut out valve.

7. In a brake mechanism, a car including a sand bolster and a car bolster movable relative thereto and adapted to be moved relative to the sand bolster according to the load in the car, a brake cylinder, a pipe having connection therewith, a pop valve in said pipe, a cut out valve in the pipe between the pop valve and the brake cylinder, a control valve, carried by the car bolster, a lever fulcrumed on the car bolster, a link pivotally connecting one end of the lever with the sand bolster, means operatively connecting the other end of the lever to the control valve, and means for operating the cut out valve from the control valve.

8. In a brake mechanism, a car including a car bolster, a sand bolster and means resiliently connecting the car bolster with the sand bolster, the car bolster being adapted to move relative to the sand bolster according to the load in the car, a brake cylinder, a pipe having connection therewith, a pop valve in said pipe, a cut out valve in the pipe between the pop valve and the brake cylinder, said valve including a valve stem, a control valve rigidly connected with the car bolster, a branch train air pipe connecting with the control valve, a piston valve, means operatively connecting the cut out valve with the piston valve, air pipes communicating with the opposite end of the piston valve and to the control valve, and means controlled by the weight of the load in the car for automatically controlling the opening and closing of the control valve.

9. In a brake mechanism, a brake cylinder, a pipe extending from the brake cylinder, a pop valve in said pipe, a control valve interposed with said pipe including a stem, and means controlled by the weight of the load in the car to automatically control the operation of said control valve.

In testimony whereof I affix my signature.

JOHN R. BENTON.